Oct. 27, 1925.
U. HIRAI
SUGAR CANE CUTTING MACHINE
Filed Oct. 28, 1922
1,559,429
3 Sheets-Sheet 1
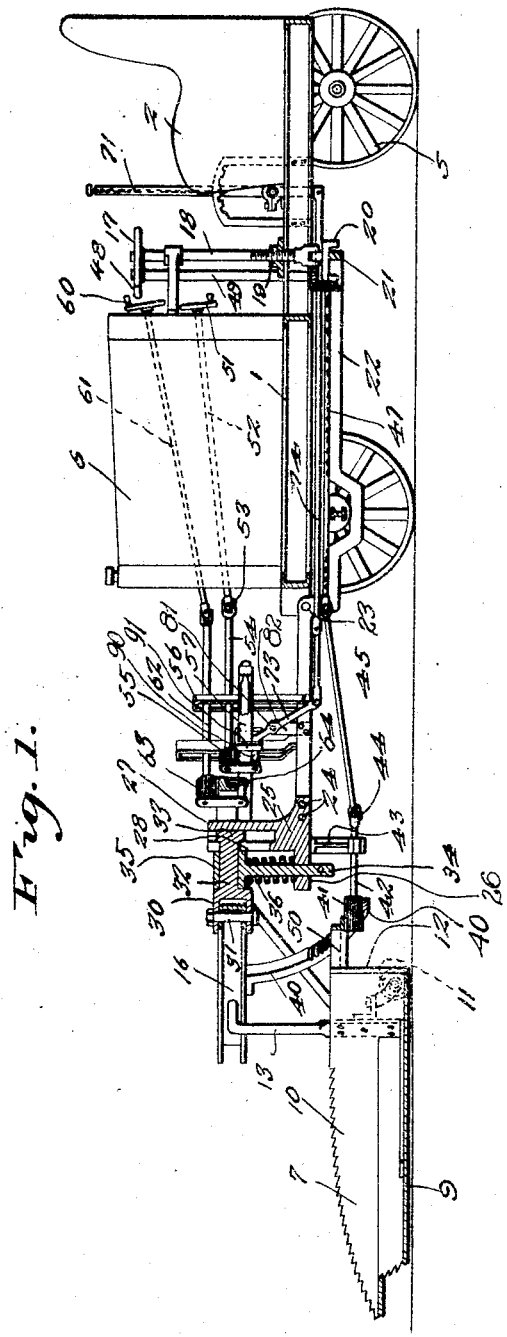
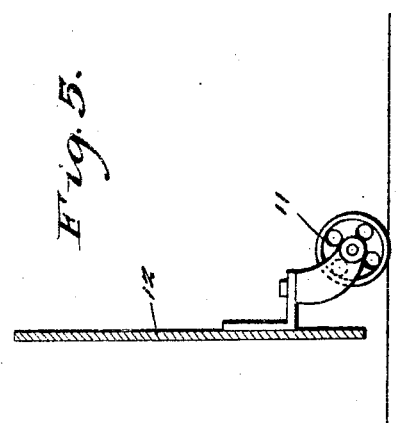
U. Hirai INVENTOR
BY Victor J. Evans
ATTORNEY
WITNESSES

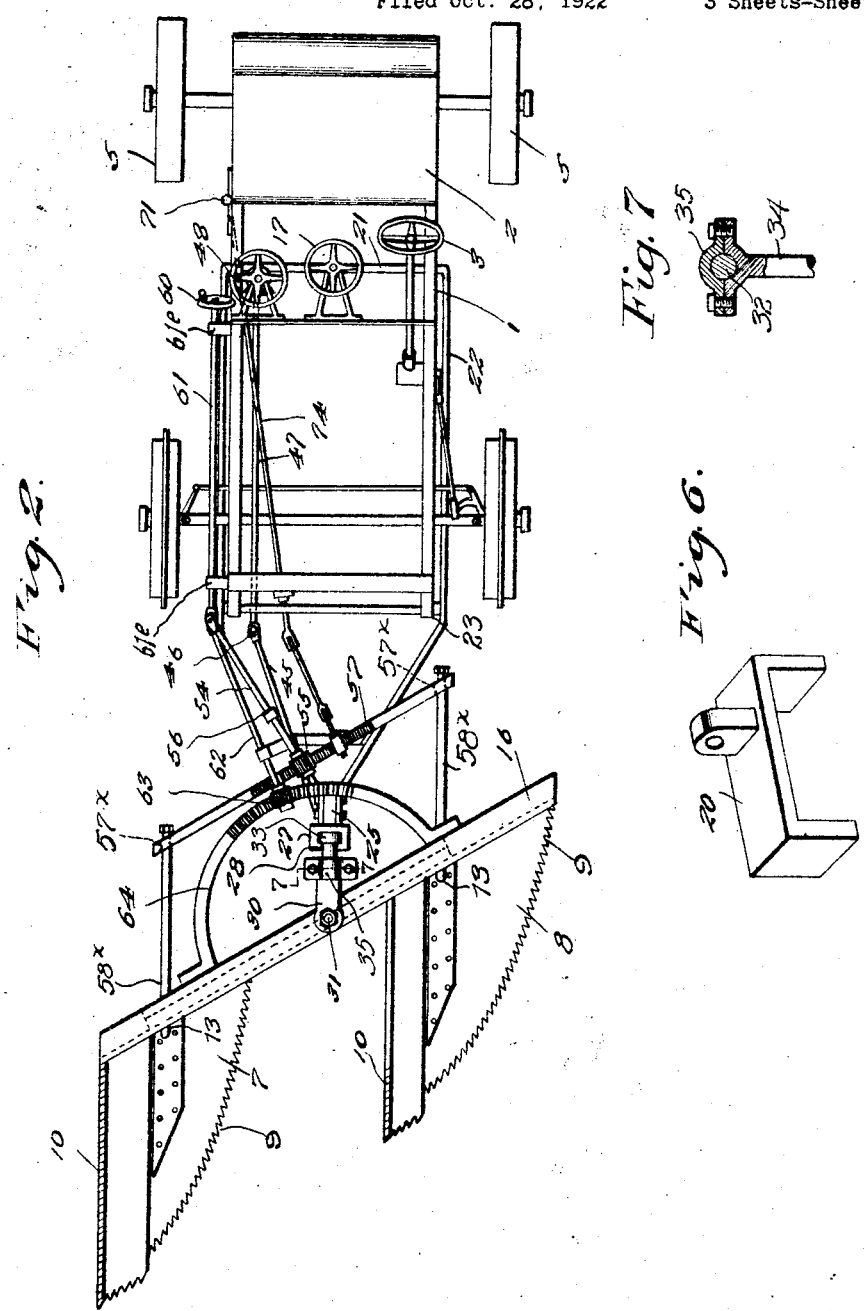

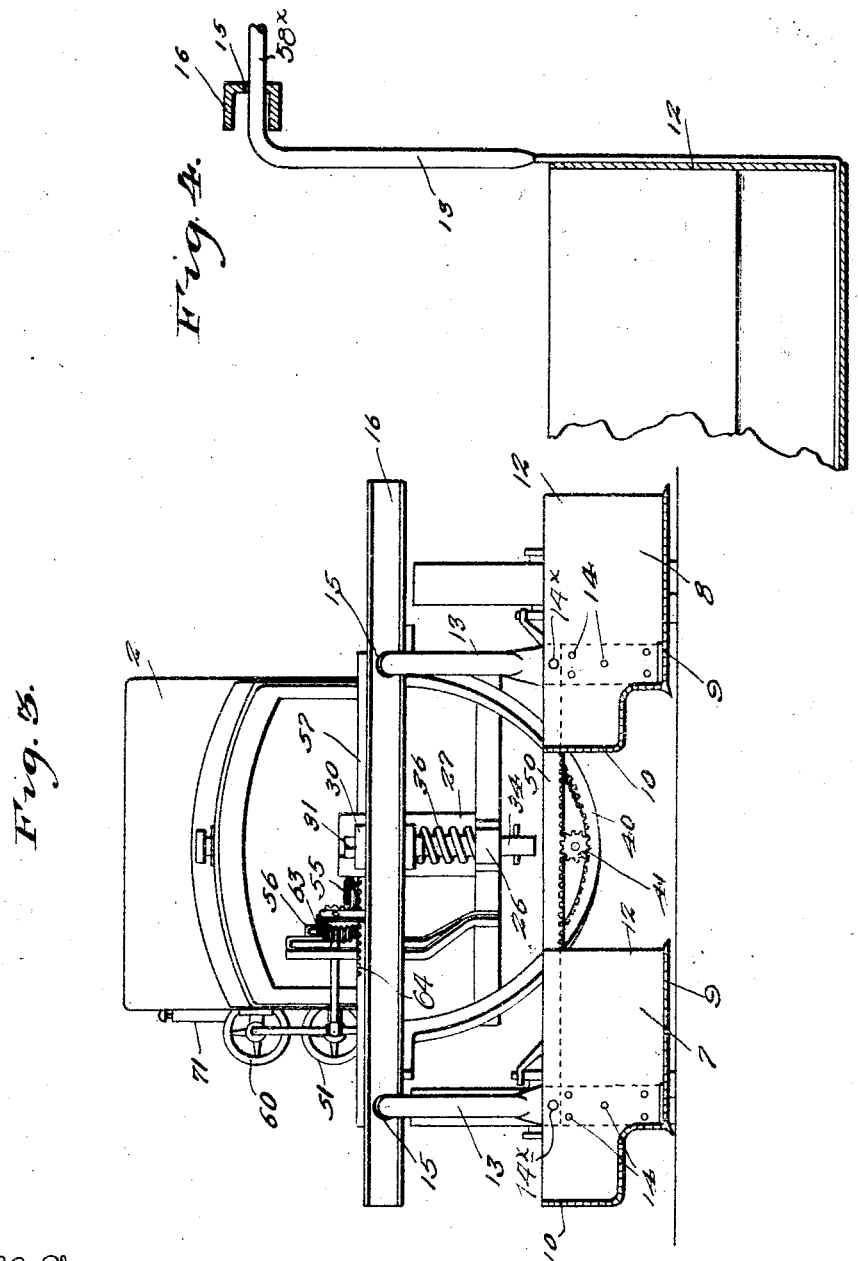

Patented Oct. 27, 1925.

1,559,429

UNITED STATES PATENT OFFICE.

UMEJIRO HIRAI, OF HONOLULU, TERRITORY OF HAWAII.

SUGAR-CANE-CUTTING MACHINE.

Application filed October 28, 1922. Serial No. 597,582.

*To all whom it may concern:*

Be it known that I, UMEJIRO HIRAI, a subject of the Emperor of Japan, residing at Honolulu, Hawaii, have invented new and useful Improvements in Sugar-Cane-Cutting Machines, of which the following is a specification.

The object of my invention is the provision of a sugar cane cutting machine constructed and arranged to work at one side of the path of movement of the machine so as to efficiently cut sugar cane such as grows in the Hawaiian Islands, and which cane is characterized by the fact that when the crop is ready for harvest large portions of the stalks lie on the ground and the remainder of the stalks extend upwardly from the ground. In consequence of the characteristic indicated the ground of a field of Hawaiian sugar cane to be harvested is covered with cane lying or extending in all directions, and this condition my novel machine is designed and adapted to adequately meet.

To the attainment of the foregoing, the invention consists in the improvement as hereinafter described and definitely claimed.

In the accompanying drawings, forming part of this specification:—

Figure 1 is a view of the machine constituting the best practical embodiment of my invention that I have as yet devised, with some parts in longitudinal vertical section and other parts in side elevation.

Figure 2 is a top plan view of the machine with the motor and its covering omitted.

Figure 3 is a view partly in front elevation and partly in vertical transverse section.

Figure 4 is an enlarged section of a portion of one of the blades.

Figure 5 is a detail view of one of the blade supporting wheels.

Figure 6 is a detail perspective of the saddle 20 of the apparatus.

Figure 7 is a detail cross section on line 7—7 of Figure 2.

Similar numerals of reference designate corresponding parts in all of the views of the drawings.

In the preferred embodiment of my invention the machine comprises a chassis or frame 1 similar to an automobile chassis and equipped with a seat such as 2, designed to accommodate two persons. In this connection I desire it understood that two persons are necessary for the operation of the machine, one person to steer the machine after the manner of an automobile through the medium of a steering wheel 3 connected in conventional manner with the forward steering wheels of the machine, and the other person having for his province to control the cutting mechanism. The rear wheels 5 of the machine are designed to be driven from a motor carried on the frame 1 and under a covering 6, the connection between the motor (not shown) and the rear wheels 5 being by preference of the ordinary well known construction and not of my invention.

At its forward end my novel machine is provided with cutting blades 7 and 8, the said cutting blades being disposed horizontally and being provided with convex saw teeth edges 9 and with straight upstanding side flanges 10 to fit the furrows of the field. The blades 7 and 8 are spaced apart with a view to bringing about the simultaneous cutting of two rows of cane incident to a single traverse of the machine across a field. Each of the blades 7 and 8 is equipped with a roller 11, designed to travel on the ground and support the blade and the parts connected therewith so that the blades will cut close to the ground. The blades 7 and 8 are also provided with heel flanges 12 which extend upwardly. It will also be noticed that bars 13 are fixed at 14 to the heel flanges 12 and are extended above the heel flanges and are then extended rearwardly through apertures 15 in a channel bar 16, disposed in a horizontal plane above the blades 7 and 8 as clearly shown in Figures 1 and 3.

For the raising of the blades 7 and 8 from the ground I provide a hand wheel 17 on a threaded upright shaft 18, the said shaft 18 being mounted at 19 in a threaded bearing on the frame 1 and being connected at its lower end in swivelled manner to a saddle 20 that rests loosely over a lateral arm 21 on a vertically swinging lever 22, Figure 1. Manifestly when the shaft 18 is turned to move the same downwardly the rear arm of the lever 22, which is fulcrumed at 23 will be depressed, and the forward arm of the said lever will be raised. At its forward end the said lever 22 is fixedly connected as designated by 24 to a casting 25 with a forwardly reaching apertured arm 26 and with an upright hollow portion 27 in the forward side of which is a vertical slot 28. The before mentioned channel bar 16 is arranged in a clevis 30 and is pivotally connected to said clevis 30 by a king bolt 31. By comparison of Figures 1 and 2 it will be noted that the clevis 30 is provided with a rearwardly directed shank 32 which is movable vertically in the slot 28 and is provided with a rear end enlargement 33 disposed and movable vertically in the before mentioned hollow upright 27. An upright pin 34 is guided in the apertured arm 26 and is provided at its upper end with a sleeve 35, sectional Figures 1 and 7, which receives the said shank 32. Interposed between the said sleeve 35 and the arm 26 is a coiled spring 36 the function of which is to yieldingly support the blades 7 and 8 and the parts connected therewith and in that way offset vibration and promote the efficiency of the machine.

Connected at its ends to the channel bar 16 is a pendent arcuate rack 40, the channel bar 16 and the said rack 40 being disposed obliquely to the path of movement of the machine. Intermeshed with the rack 40 is a spur gear 41, the said spur gear 41 being fixed to a shaft 42 journaled in a hanger 43 carried by and movable vertically with the casting 25. At its rear end the shaft 42 is connected through an universal joint 44 with a rearwardly extending shaft 45, and the rear end of the said shaft 45 is connected by an universal joint 46 with a rearwardly extending shaft 47 in connection with a hand wheel 48 on an upright shaft 49. By turning the hand wheel 48 and the shaft 49, one operator is enabled to tip the bar 16 in order to adapt the cutting apparatus to the surface over which the machine is being moved. When the cutting apparatus is adjusted as stated a rack 50, Figure 1, moves to the side by which means the cutting blades are kept level although at different elevations, the said blade being pivoted at 14ˣ to said rack. At 51 is a handle to adjust the angle between the cutting blades and the channel bar 16, said handle being in the form of a wheel and being fixed to a shaft 52 connected by an universal joint 53 with a shaft 54 on which is a spur gear 55. The shaft 54 is maintained in proper position by a slotted bar 56 on the lever 22, and therefore when the gear 55 is rotated a rack 57 will be moved endwise in one direction or the other according to the direction of rotation of the shaft 54. Said rack 57 has apertures 57ˣ near its ends which loosely receive rearwardly extending and headed portions 58ˣ of the bars 13, which bars 13 also have portions journalled in the apertures 15 of the bar 16 Figure 3. When the rack 57 is moved toward the right or left hand side of the machine, the blades 7 and 8 will be correspondingly moved by the movement of the bars 13. At 60 is a handle or hand wheel for adjusting the angle between the channel bar 16 and the center line of the machine. The said hand wheel 60 is connected by shafts 61 and 62 with a gear 63. Supports 61ᵉ are used in conjunction with the shaft 61. The said gear 63 is meshed with an arcuate rack 64 fixed to the bar 16, and is designed to move the said rack toward the right or the left, the channel bar 16 being adapted to swing or turn on the king bolt 31.

At 71 is a hand lever for adjusting the forward ends of the blades 7 and 8 vertically. When it is desired to lower the forward ends of the said blades the upper arm of a lever 71 is moved rearwardly, whereupon the lower arm of a lever 73, connected through rod 74 with the lever 71 will be moved forwardly so that the lever 73 will raise the bar 57, whereupon through connections 58ˣ the blades 7 and 8 will be depressed. Manifestly opposite movement of the lever 71 will be attended by raising of the blades 7 and 8.

The lever 73 is pivoted at 81 on a support 82, Figure 1, carried by the forward arm of the longitudinal vertical swinging lever 22, and the upper arm of said lever is provided with a substantially horizontal portion 90 arranged under the rack 57 and in a clevis 91 that also receives the rack 57 so that when the lever 73 is rocked in the proper direction the rack 57 will be raised. For the rocking of the channel bar 16 it is essential to relatively arrange the shank 32 in the pin 34 and to yieldingly support said pin 34 on the head or casing 25, Figures 1 and 7.

The operation of the machine will be understood when it is stated that the hand wheel 17 is for the raising of the blades 7 and 8 from the ground; the hand wheel 51 is for adjusting the angle between the cutting blades; the hand lever 71 is for adjusting the forward ends of the blades 7 and 8 vertically; the hand wheel 3 is for steering the machine; the hand wheel 60 is for adjusting the angle between the channel bar 16 and the center line of the machine; and the hand wheel 48 is for tipping the cutting apparatus.

Having described my invention, what I claim and desire to secure by Letters-Patent, is:—

1. In a cane cutting machine, the combination of a wheeled frame, means for steering the frame, a longitudinal vertically swinging lever fulcrumed on the frame and extending forwardly therefrom, manually operable means on the frame to depress the rear arm of the said lever, a head carried by the forward arm of said lever, a spring-supported pin movable vertically relative to said head, a clevis journalled in said pin and movable in said head, a bar pivotally connected at an intermediate point of its length to said clevis, cutting blades connected with and disposed in a horizontal plane below said pivoted bar, a pendent curvilinear rack connected at its ends to and arranged below said bar, an arcuate rack connected at its ends to and disposed in rear of the pivoted bar, connections extending rearwardly from said pivoted bar, a rack bar carried by said connections, a rack bar connected with the blades, gears intermeshed with said rack bars, and manually-operable devices on the frame and connected with said gears for the actuation of the latter.

2. In a cane cutting machine, the combination of a wheeled frame, means for steering the frame, a longitudinal vertically swinging lever fulcrumed on the frame and extending forwardly therefrom, manually-operable means on the frame to depress the rear arm of the said lever, a head carried by the forward arm of said lever, a spring-supported pin movable vertically relative to said head, a clevis journalled in said pin and movable in said head, a bar pivotally connected at an intermediate point of its length to said clevis, cutting blades connected with and disposed in a horizontal plane below said pivoted bar, a pendent curvilinear rack connected at its ends to and arranged below said pivoted bar, an arcuate rack connected at its ends to and disposed in rear of the pivoted bar, connections extending rearwardly from said pivoted bar, a rack bar carried by said connections, a rack bar connected with the blades, gears intermeshed with said rack bars, and manually-operable devices on the frame and connected with said gears for the actuation of the latter; the said longitudinal vertically swinging lever on the frame being equipped with upright guides, and said manually operable devices including shafts complementary to certain of the gears and disposed in said guides.

3. In a cane cutting machine, the combination of supporting means, cutting blades spaced apart, a yieldingly supported and vertically movable bar connected with said blades and mounted to swing vertically and horizonally, a rack and pinion for swinging said bar vertically, a rack and pinion for swinging said bar horizontally, and manually operable means for rotating said pinions.

4. In a cane cutting machine, the combination of supporting means, cutting blades spaced apart, a yieldingly supported and vertically movable bar being with which said blades are adjustably connected, said bar mounted to swing vertically and horizontally, a rack and pinion for moving said bar horizontally, racks and pinions for adjusting the blades relatively to the bar, and means operated manually for rotating said pinions.

5. In a cane cutting machine, the combination of a supporting transverse bar, cutting blades spaced apart, members carried by and movable in the transverse bar and having pendent forward portions connected to said blades and also having portions extending rearwardly from the bar, a rack connected to said rearwardly extending portions of said members, a rack connecting the said blades together, pinions meshed with said racks, and manually operable means for rotating said pinions.

In testimony whereof I affix my signature.

UMEJIRO HIRAI.